United States Patent
Harrison et al.

(10) Patent No.: US 7,021,131 B2
(45) Date of Patent: Apr. 4, 2006

(54) FIXTURE FOR SUPPORTING A BRAKE PEDAL TESTER

(75) Inventors: Brett Harrison, Union, MO (US); Denis Kramer, St. Peters, MO (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/740,167

(22) Filed: Dec. 18, 2003

(65) Prior Publication Data
US 2005/0072222 A1  Apr. 7, 2005

Related U.S. Application Data

(60) Provisional application No. 60/508,986, filed on Oct. 6, 2003.

(51) Int. Cl.
*G01L 5/28* (2006.01)

(52) U.S. Cl. .................................. 73/132
(58) Field of Classification Search .............. 73/129, 73/132, 121, 130, 131
See application file for complete search history.

(56) References Cited

U.S. PATENT DOCUMENTS

| | | | | |
|---|---|---|---|---|
| 3,662,593 A | * | 5/1972 | Pirrello et al. | 73/132 |
| 3,877,299 A | * | 4/1975 | Clayton et al. | 73/132 |
| 3,977,241 A | * | 8/1976 | Asmus et al. | 73/132 |
| 3,991,609 A | * | 11/1976 | Asmus et al. | 73/132 |
| 4,186,595 A | | 2/1980 | Domitter | |
| 4,307,604 A | | 12/1981 | Domitter | |
| 4,438,835 A | * | 3/1984 | Dowden et al. | 477/193 |
| 4,771,387 A | | 9/1988 | Hexel et al. | |
| 5,168,750 A | * | 12/1992 | Kurtz | 73/132 |

OTHER PUBLICATIONS

HBT 250 Brake System Certification Machines Specifications, Dominion Tool & Die website Mar. 23, 2004.

* cited by examiner

*Primary Examiner*—Eric S. McCall
(74) *Attorney, Agent, or Firm*—Ralph E. Smith

(57) ABSTRACT

A fixture supports a brake pedal tester on a floor pan of an automotive vehicle. Locking pins are mounted on the fixture. The locking pins are adapted to extend into locating holes in the floor pan. The brake pedal tester is mounted on the fixture forwardly of the locking pins. The locking pins have notches engageable with edges of the locating holes to prevent the fixture from lifting up when the tester is operated. A locating pin on the fixture rearwardly of the locking pins is adapted to extend into another locating hole in the floor pan.

10 Claims, 4 Drawing Sheets

FIXTURE FOR SUPPORTING A BRAKE PEDAL TESTER

RELATED APPLICATION(S)

This application claims the priority of U.S. Provisional Patent Application Ser. No. 60/508,986, filed Oct. 6, 2003.

FIELD OF THE INVENTION

This invention relates generally to fixtures and more particularly to a fixture for supporting a brake pedal tester.

BACKGROUND OF THE INVENTION

Brake pedal testers are employed to test the braking system of an automotive vehicle. For example, the tester may discover leaks in the hydraulic system. A brake pedal tester now in use is mounted on a fixture and has a test head that engages and presses upon the brake pedal. The fixture is supported on the floor pan of the vehicle and has pins at the rear of the fixture to locate in holes in the floor pan. However, there is nothing to lock the fixture down on the floor pan. The pins establish a rear pivot point such that when the test head is advanced to depress the brake pedal, the fixture will tend to rotate about the rear pivot point, lifting up on the front. The upward pressure on the fixture causes a considerable side load on the test head, producing erroneous test readings and often causing substantial damage to the test head.

SUMMARY OF THE INVENTION

In accordance with the present invention, a locking feature is added to prevent the fixture from lifting up when the test head is operated. More specifically, the fixture has at least one and preferably two locking pins which engage in locating holes in the floor pan. These locking pins have locking notches which engage edges of the locating holes to lock the fixture down firmly on the floor pan. The locking pins are preferably at the front of the fixture. When the test head advances and engages the brake pedal, the fixture will attempt to pivot around the front of the fixture rather than the rear. However, this is prevented by the notches in the locking pins, and by the presence of a third pin at the rear of the fixture which locates in a rear hole in the floor pan.

As a further feature of the invention, one of the locking pins can be moved relative to the other locking pin to ensure a positive locking engagement of the notches of the locking pins with the edges of the locating holes. A fluid cylinder may be used for this purpose.

The benefits of the fixture of this invention are more accurate test results and less wear and tear on the test head.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
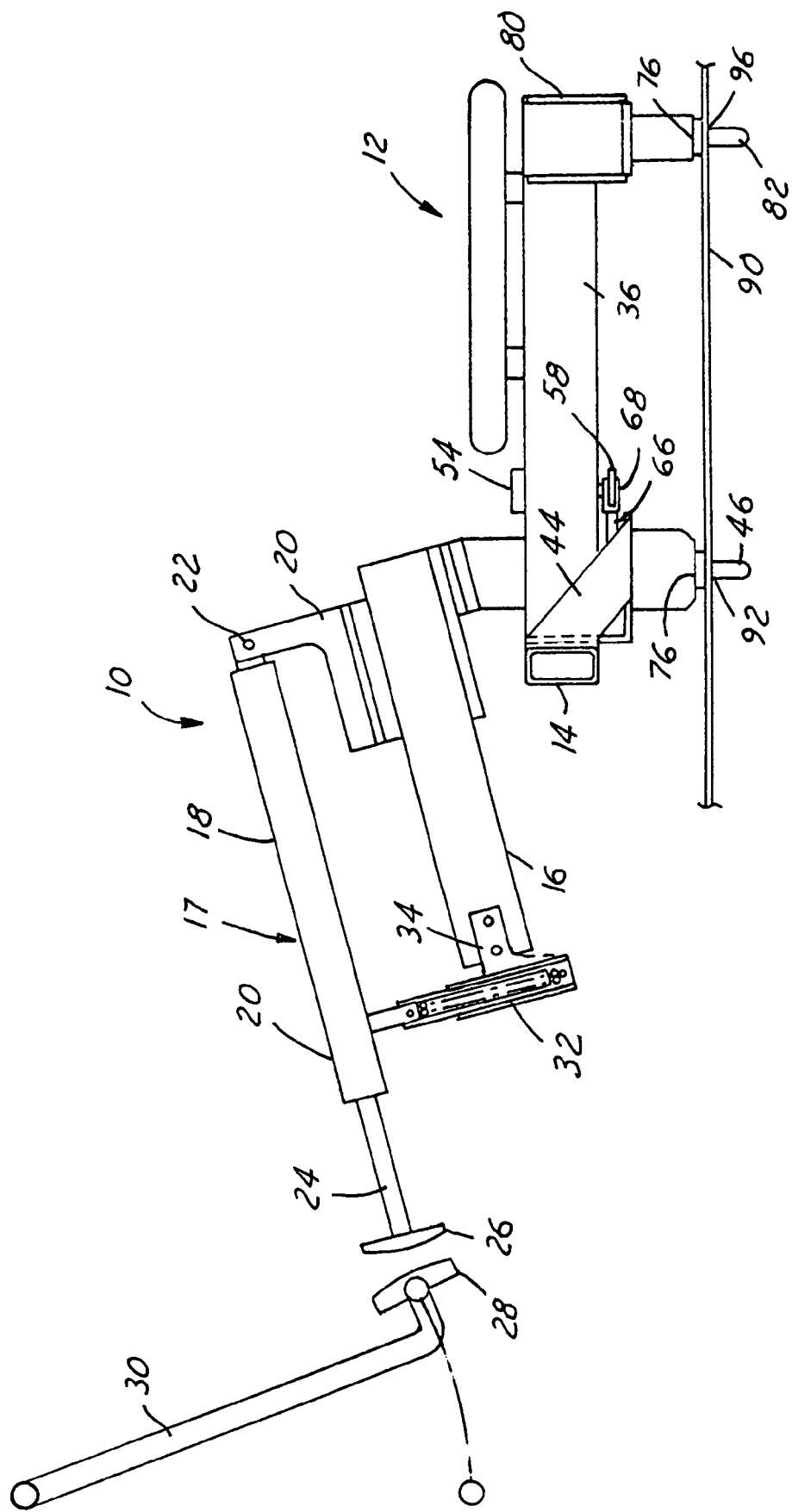
FIG. 1 is a side elevational view for a fixture for supporting a brake tester, in accordance with the present invention.
Figure 2:
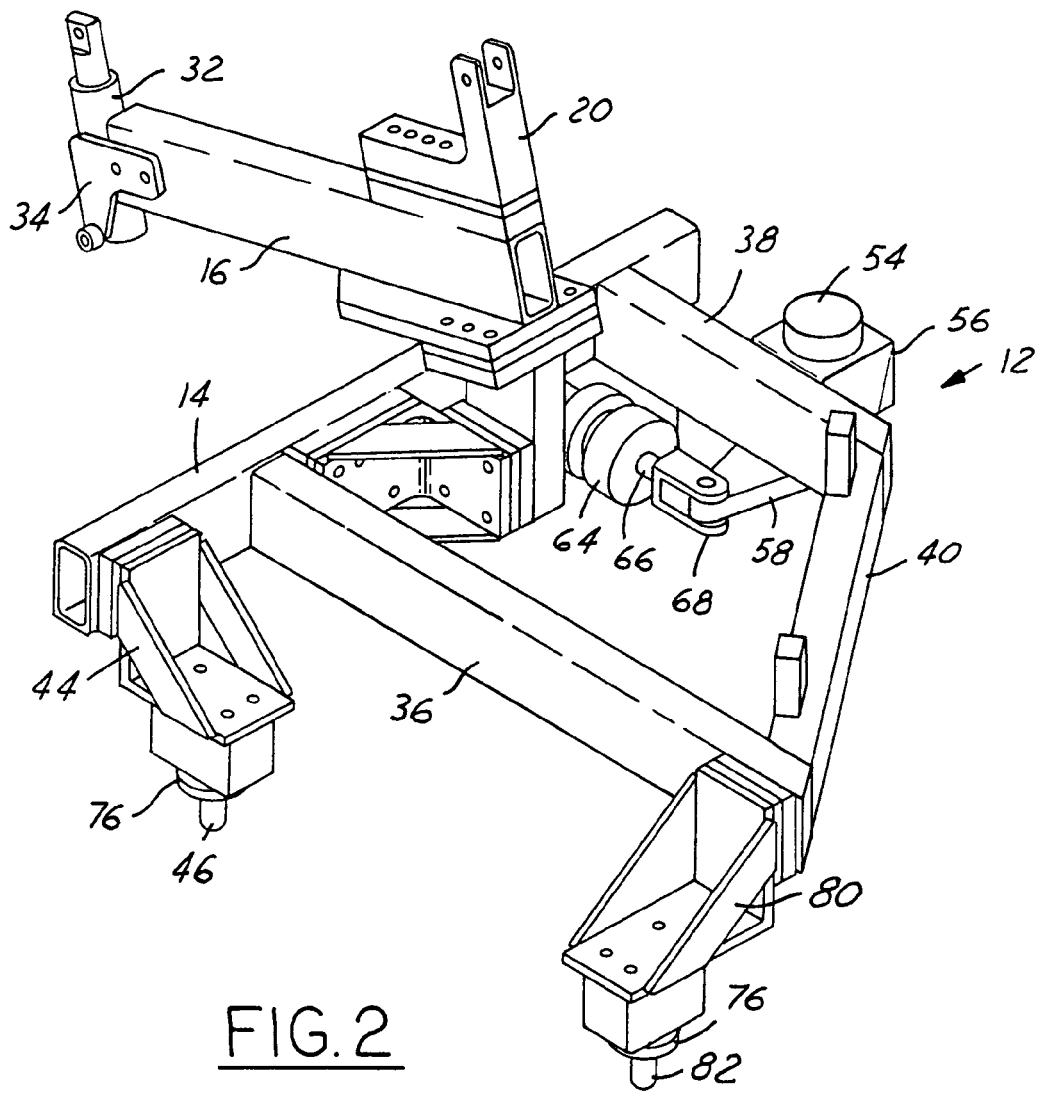
FIG. 2 is a perspective view of the fixture, but with the brake tester removed.
Figure 3:
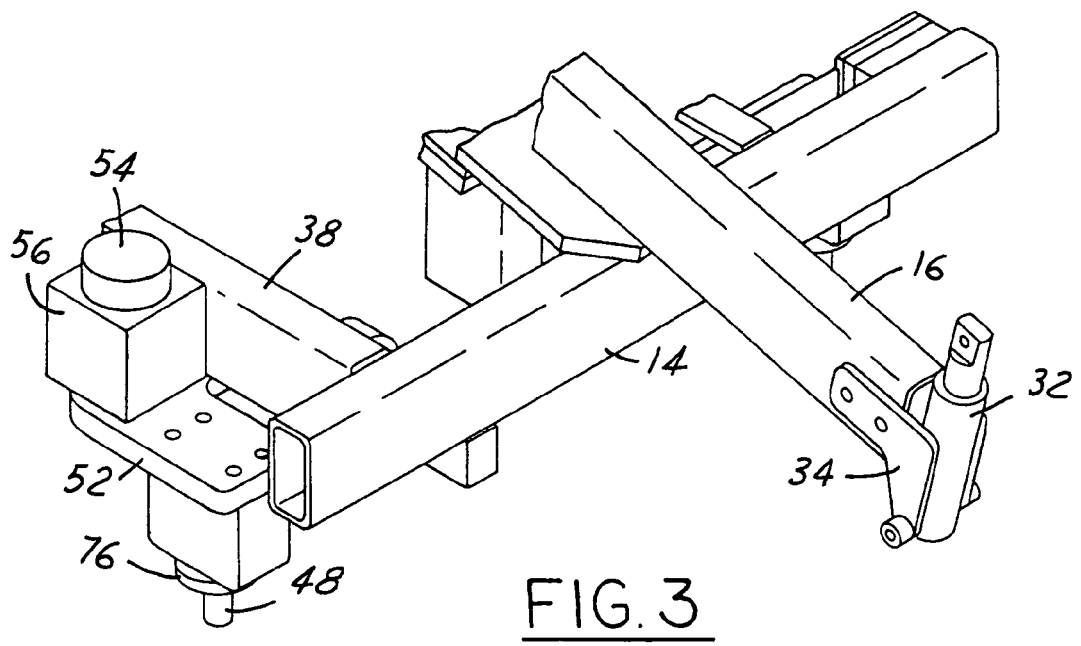
FIG. 3 is a fragmentary perspective view of the fixture, as seen from a different angle.
Figure 4:
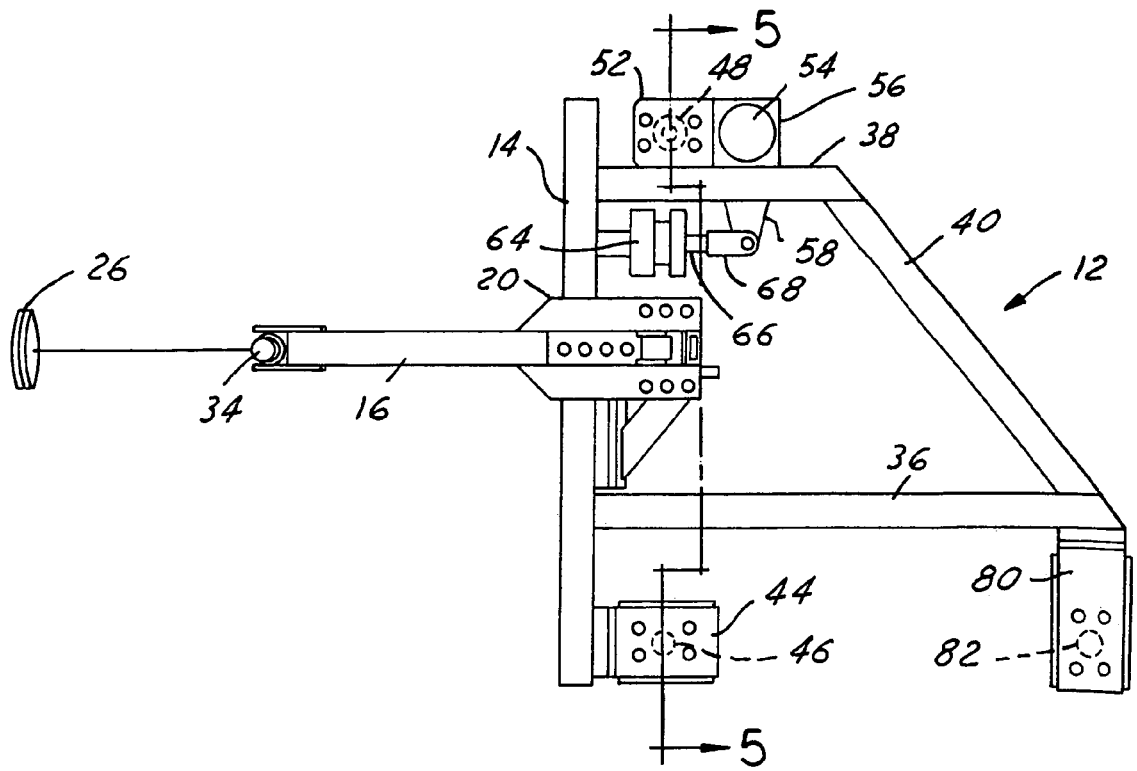
FIG. 4 is a top plan view of the fixture.
Figure 5:
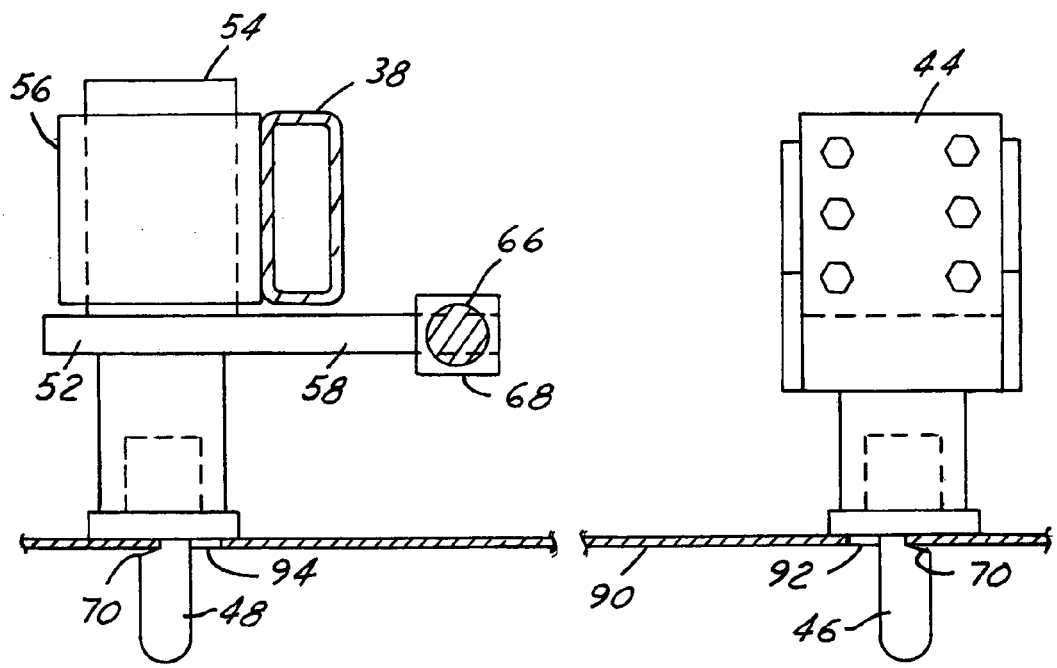
FIG. 5 is a sectional view taken on the line 5—5 in FIG. 4.
Figure 8:
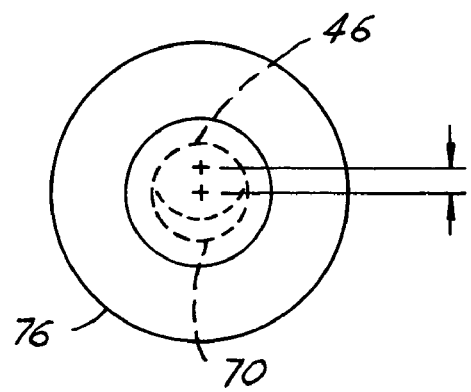
FIG. 8 is a top view of the locking pin.
Figure 6:
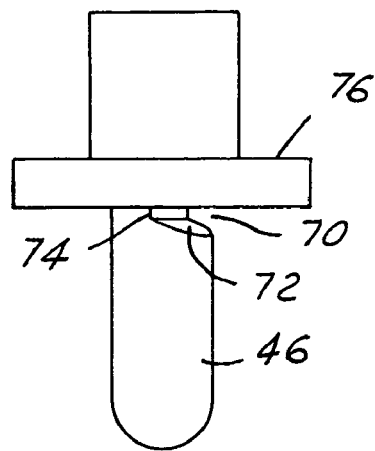
FIG. 6 is a view showing one side of a locking pin.
Figure 7:
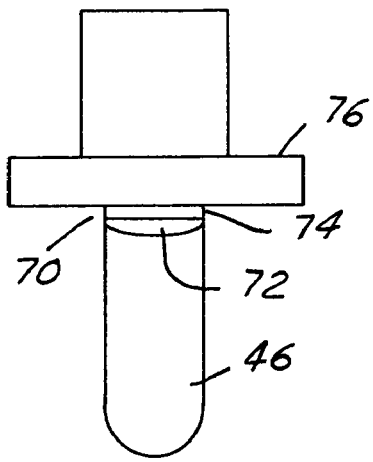
FIG. 7 is a view showing another side of the locking pin.
Figure 9:
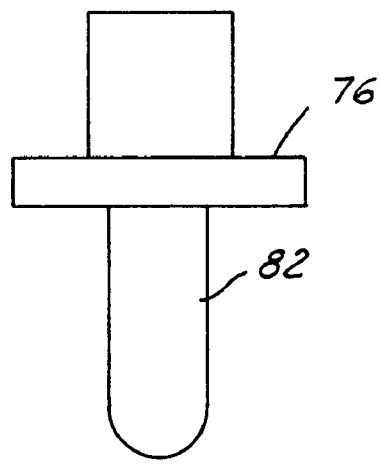
FIG. 9 is a side view of a locating pin.

The following description of the preferred embodiment is merely exemplary in nature and is in no way intended to limit the invention, its application, or uses.

Referring now more particularly to the drawings, there is shown a brake pedal tester 10 and a fixture 12.

The fixture 12 has a transverse front bar 14. A forwardly extending bar 16 is secured to the front bar 14. The tester 10 comprises a test head 17 having a fluid cylinder 18 the rear end of which is pivoted to a bracket 20 on the bar 16 by a horizontal pivot pin 22. A piston (not shown) is reciprocable in the fluid cylinder 18. A piston rod 24 extends from the piston through the front end of the cylinder 18. A pad 26 on the end of the rod 24 is engageable with a brake pedal 28 on the lower end of a pivoted brake lever 30 when the rod 24 is extended. A spring unit 32 pivoted to the cylinder 18 and to a bracket 34 on the front end of the bar 16 is a spring loaded pedal following mechanism. Connected to the front bar 14 of fixture 12 are laterally spaced-apart side bars 36 and 38, and connected to the side bars is a transverse rear bar 40.

A bracket 44 is rigidly secured to one end of the front bar 14 of the fixture. A vertical locking pin 46 is secured to and extends downwardly from the bracket 44. A second vertical locking pin 48 is laterally spaced from the locking pin 46 and is secured to and extends downwardly from a bracket 52. The bracket 52 is secured to a hub 54. The hub 54 is mounted in a bearing block 56 on the bar 38 for pivotal movement on a vertical axis. The bracket 52 has a laterally inwardly extending lever arm 58. The pins 46 and 48 are at the front of the fixture 12, but rearwardly of the tester 10.

A pneumatic cylinder 64 is secured to the front bar 14 of the fixture. A piston (not shown) in the cylinder 64 has a rod 66 extending through the rear end of the cylinder. A clevis 68 on the outer end of the rod 66 is pivoted to the inner end of the arm 58. Extension or retraction of the rod 66 pivots the arm 58 and moves the locking pin 48 toward and away from the locking pin 46.

Locking pins 46 and 48 are substantially identical. Each pin 46, 48 is cylindrical and has a rounded lower end. Each pin has a notch 70 in its outer side wall. The lower surface of each notch is defined in part by a ramp 72 which slants from the side wall of the pin upwardly and radially inwardly to the bottom 74 of the notch. A horizontal annular abutment ring 76 immediately above the notch 70 extends radially outwardly from each locking pin.

A bracket 80 is rigidly secured to the rear end of the side bar 36 of the fixture. A vertical locating pin 82 is secured to and extends downwardly from the bracket 80. The locating pin 82 is substantially identical to the locking pins 46 and 48, except that the locating pin 82 does not have a notch.

The fixture 12 is adapted to be supported on a horizontal floor pan 90 of the vehicle in a position to the rear of the brake pedal 28. Locating holes 92, 94 and 96 in the floor pan are arranged in the same spaced-apart relationship as the pins 46, 48 and 82 in positions to receive the pins when the fixture is supported on the floor pan. The holes are only slightly larger than the pins to closely receive the pins.

In use, with the fixture 12 resting on the floor pan 90 and the locking pins 46, 48 in the floor pan holes 92 and 94 and the locating pin 82 in the floor pan hole 96, the cylinder 64 is actuated to extend its piston and urge the locking pin 48 away from the locking pin 46. Because the notches 70 are on the outer sides of the locking pins, this movement of the locking pin 48 relative to the locking pin 46 will insure that the outer edges of the holes 92 and 94 will extend deeply into the notches. The ramps 72 will at the same time pull the pins downwardly until to abutment rings 76 engage the floor pan 90 and draw the fixture down firmly on the floor pan.

When the tester 10 is actuated to extend the pad 26 on the rod 24 against the brake pedal, the reaction force on the fixture 12 will tend to lift up the front end of the fixture about the locking pins 46, 48 as a pivot point. Such lifting up will be prevented by the notched locking pins with added help from the pin 82 in the hole 96 at the rear of the fixture.

It should be understood that the notches 70 may be formed in the inner sides of the locking pins 46 and 48 rather than the outer sides thereof, in which case the cylinder 64 when activated will move the locking pin 48 toward, rather than away from, the locking pin 46 to cause the inner edges of the holes 92 and 94 to extend deeply into the notches.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A fixture for supporting a brake pedal tester on a floor pan of an automotive vehicle comprising:
   a support for mounting the tester on the fixture,
   a plurality of pins mounted on the fixture in spaced-apart relation to one another and adapted to extend in a first direction into locating holes in the floor pan to locate the fixture, at least one of said pins being movable in a direction substantially transverse to said first direction; and
   a locking device for locking the fixture on the floor pan and preventing the fixture from lifting up when the tester is operated.

2. The fixture of claim 1, wherein:
   said locking device comprises a locking notch in at least one of said pins, said locking notch being engageable with an edge of one of said locating holes to lock said at least one of said pins in said one of said location holes to prevent the fixture from lifting up when the tester is operated.

3. The fixture of claim 2, wherein:
   said at least one of said pins has a ramp leading to said locking notch adapted to draw said edge of said one of said locating holes deeply into said locking notch.

4. A fixture for supporting a brake pedal tester on a floor pan of an automotive vehicle, comprising:
   a support for mounting the tester on the fixture, and
   first and second locking pins mounted on the fixture in laterally spaced-apart relation to one another and adapted to extend into respective laterally spaced-apart first and second locating holes in the floor pan,
   wherein said first and second locking pins each include a locking notch having a ramp, said ramp being adapted to draw edges of said first and second locating holes deeply into said locking notches and the fixture down firmly on the floor pan when the tester is operated.

5. The fixture of claim 4, wherein:
   said support mounts the brake pedal tester forwardly of said locking pins, and
   further including a locating pin mounted on the fixture rearwardly of said locking pins,
   said locating pin being adapted to extend into a third locating hole in the floor pan.

6. The fixture of claim 5, wherein:
   said first locking pin is mounted on the fixture for adjustment toward and away from said second looking pin.

7. The fixture of claim 6, wherein:
   said first locking pin is mounted on the fixture by a pin holder, which holds said first locking pin and is pivoted on the fixture, and
   a fluid cylinder for pivoting said pin holder in one direction.

8. A fixture for supporting a brake pedal tester on a floor pan of an automotive vehicle comprising:
   a support for mounting the tester on the fixture,
   a plurality of pins mounted on the fixture in spaced-apart relation to one another and adapted to extend into locating holes in the floor pan to locate the fixture; and
   a locking device for locking the fixture on the floor pan and preventing the fixture from lifting up when the tester is operated;
   wherein at least one of said pins is mounted on the fixture for adjustment toward and away from the other of said pins.

9. The fixture of claim 8, wherein:
   said locking device comprises a locking notch in at least one of said pins, said locking notch being engageable with an edge of one of said locating holes to lock said at least one of said pins in said one of said locating holes to prevent the fixture from lifting up when the tester is operated.

10. The fixture of claim 9, wherein:
    said at least one of said pins has a ramp leading to said locking notch adapted to draw said edge of said one of said locating holes deeply into said locking notch.

* * * * *